B. S. WILLIAMS.
PERCOLATOR.
APPLICATION FILED OCT. 2, 1920.

1,403,724.

Patented Jan. 17, 1922.
2 SHEETS—SHEET 1.

INVENTOR.
BENJAMIN S. WILLIAMS,
BY
ATTORNEY

B. S. WILLIAMS.
PERCOLATOR.
APPLICATION FILED OCT. 2, 1920.
1,403,724.
Patented Jan. 17, 1922.
2 SHEETS—SHEET 2.
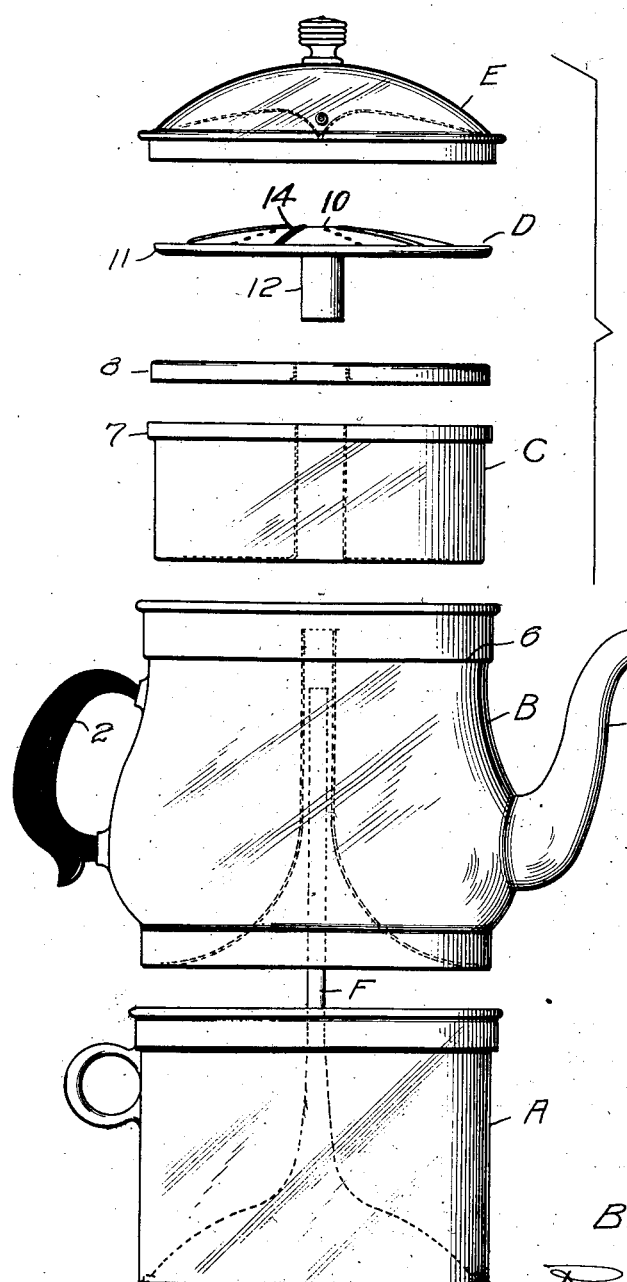
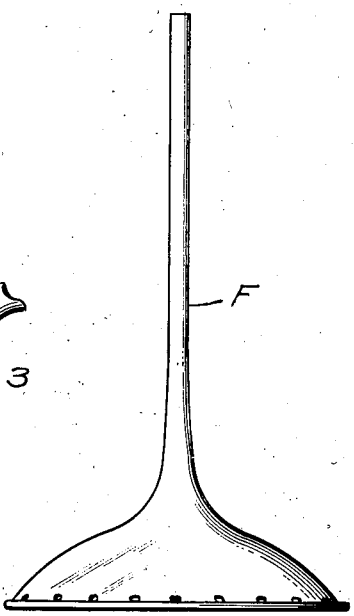
INVENTOR.
BENJAMIN S. WILLIAMS,
BY
Ralph T. Barrett
ATTORNEY.

UNITED STATES PATENT OFFICE.

BENJAMIN S. WILLIAMS, OF NASHVILLE, TENNESSEE.

PERCOLATOR.

1,403,724.   Specification of Letters Patent.   Patented Jan. 17, 1922.

Application filed October 2, 1920. Serial No. 414,156.

*To all whom it may concern:*

Be it known that BENJAMIN S. WILLIAMS, a citizen of the United States, residing at Nashville, in the county of Davidson and State of Tennessee, has invented certain new and useful Improvements in Percolators, of which the following is a specification.

This invention relates to certain improvements in percolators of that type wherein the water is allowed to pass only once through the coffee after which it is retained in a chamber, the latter being located in such a position that the heating medium cannot bring same to a boiling temperature.

One of the objects of the present invention is to construct a device of the class described in such a manner that a plurality of portable containers are provided, readily assembled preparatory to the heating operation, and easily separated for convenient manipulation in serving the contents.

Another object is the provision of means for preparing coffee either by the condensation of vapors or the direct application of the heated water, this change in operation being possible through the use or removal of a single element.

Another object resides in the provision of a cover having a cooling chamber to aid in the condensation of the vapors and a distributing plate for feeding the condensed vapors to the coffee container.

Other objects will appear by reference to the accompanying drawings forming a part of this specification and wherein like numerals of reference designate corresponding parts throughout the several views, in which:—

Fig. 3 is a side elevation showing the parts in position for assembling, and

Fig. 4 is a side elevation of the water feed.

Figure 1:
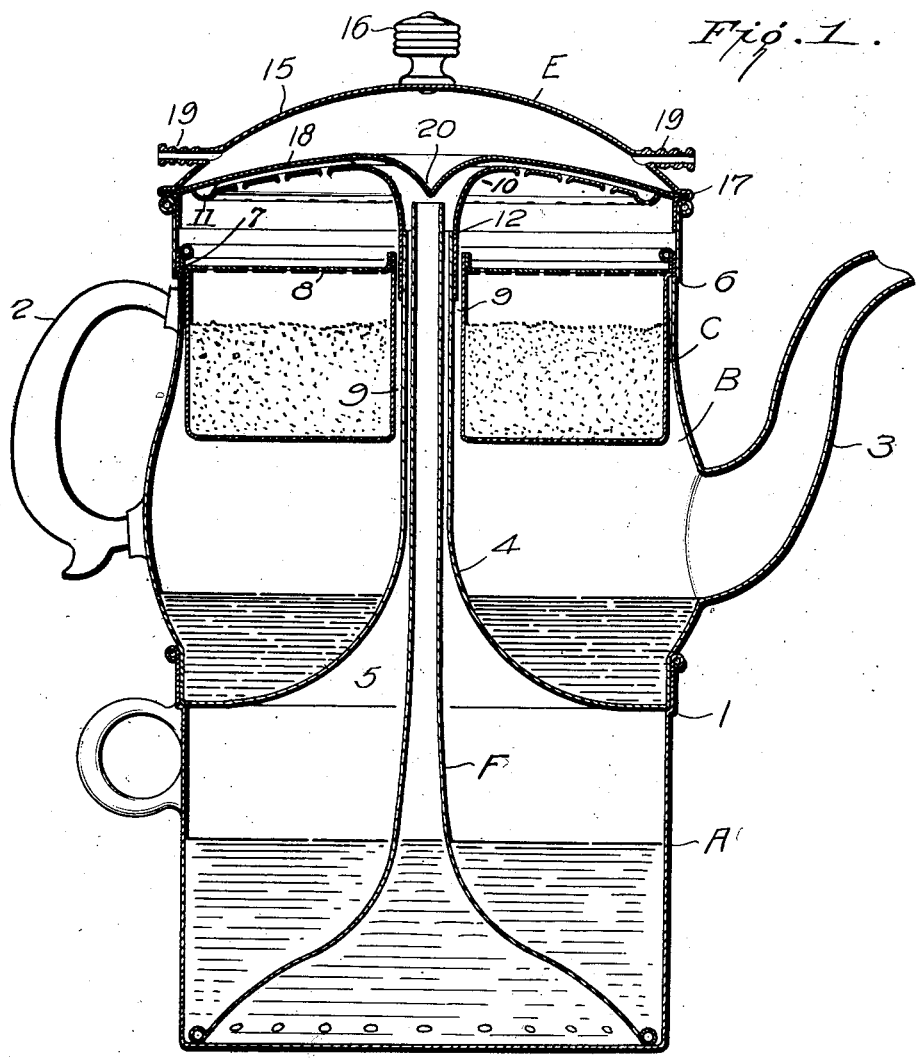
Fig. 1 is a vertical section through the assembled device.

The invention comprises a boiler A constructed for the direct application of heat and being of conventional cylindrical form with the exception of the annular shoulder 1 formed near the top for the reception of the coffee pot B.

The pot B which includes the handle 2 and the spout 3 is provided with the centrally arranged tube 4 which is of gradually enlarged diameter towards its base where it forms an integral part of the bottom of the pot. This construction forms the additional space 5 for the reception of the vapors from the boiler and at the same time increases the heating surface of the pot. The upper edge of the pot is off-set to form the annular shoulder 6 upon which rests the coffee container C. This container C which may be constructed of any suitable perforated material is formed with the shoulder 7 which engages and seats on the shoulder formed near the upper edge of the pot. A suitable cover for this coffee container is indicated by the reference character 8. It will be seen that both the container and cover are formed with the central enclosed passage 9 through which the tube 4 passes for the reception of the distributor D.

Figure 2:
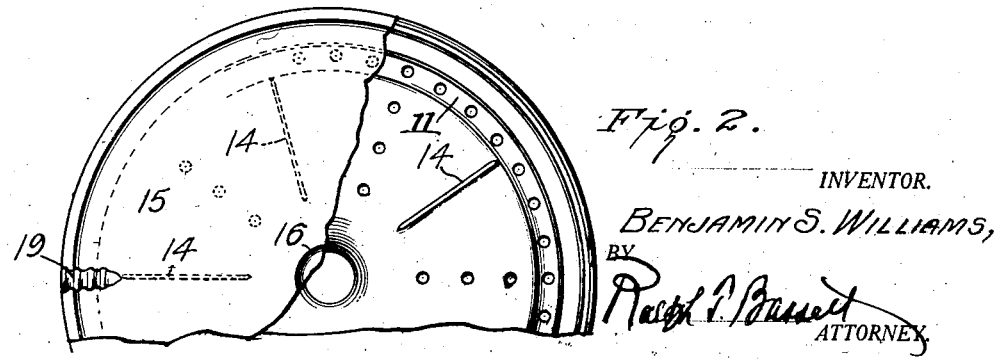
Fig. 2 is a fragmentary plan view of the distributor.

The distributor D, the function of which will be more clearly hereinafter described, consists of a perforated plate having raised central portion 10, an annular trough 11, and the downwardly projecting nipple 12 for engagement with the upper end of the tube 4. The perforations in this plate extend to and around the trough as shown more clearly in Figure 2. There is also shown in this figure the radiating corrugations 14 provided as a reinforcing means and also to space the distributor from the cover to permit the passage of the vapor and liquid.

The cover E is made in two sections. The top section 15 to which is secured the nob 16 is bent downwardly and inwardly upon itself to form the annular pocket 17 in which is received the edge of the lower section 18, the latter being spaced from the top section 15 thereby forming a chamber in which cooling means may be introduced. Suitable hose connections 19 are arranged to permit the passage of the cooling medium. Referring again to the lower section of the cover it will be seen that a downwardly extending inverted cone shaped extension 20 is provided at the center thereof for the purpose of spreading the liquid forced through the central tubes over the distributor, and in this connection an additional tube F is provided. This tube F, which is only necessary when coffee is being prepared by forcing the water in the boiler directly to the pot, is of the general shape of an inverted funnel, being perforated near its lower edge and gradually tapering to the top. In position it projects upwardly to discharge the contents of the boiler against the inverted cone shaped extension 20.

In use it will be seen that in the first instance the arrangement can be utilized for the preparation of coffee from any kind of water, as by the removal of the tube F only products of condensation can pass into the coffee pot. The preparation of coffee by the condensation of steam has been found to be very rapid especially through the use of the condenser formed by the cover, the steam being projected over the lower wall of the condenser cover by means of the distributor D. It will be obvious that the radiating corrugations and the outer wall of the trough 11 engage the lower wall of the condenser thereby providing sufficient passage for the steam or heated water.

When it is desired to prepare coffee by the direct application of heated water to the ground coffee bean the tube F is placed in the lower boiler and the conventional percolator action is present, i. e., the water under the action of the steam in the boiler is forced through this tube against the projection 20, which spreads same over the distributor through which it passes into the container C, the latter holding the granulated coffee.

In no instance is the prepared coffee after once passing through the chamber C subjected to a boiling action, nor does it again come into contact with the granulated coffee. Also the pot containing the preparation may be easily lifted from the boiler and placed in any desired place as the smut and black resultant from the direct application of heat is absent. This latter feature is very important and eliminates considerable annoyance and inconvenience.

Other features will appear by consideration of the construction through which I am enabled to procure numerous advantages and results, as for instance the use of the apparatus for the preparation, by steaming, of cereals; the preparation of drinks such as tea and coffee from any kind of water (salty, muddy, impure etc.) by removing the member F and distilling same; and the general construction which enables easy cleaning of the parts.

What I claim as new and useful and desire to secure by Letters Patent, is:—

1. A percolator comprising a boiler, a coffee pot seated on said boiler having a central tube, a container within said pot having perforated walls, a cover for said pot, and a distributor fixed to the upper end of said tube having radiating corrugations and an annular perforated trough.

2. In a device of the class described, a boiler, a coffee pot supported by said boiler formed with a central tube having downwardly diverging walls, a holder for comminuted coffee arranged within said pot, a distributer having a downwardly projecting nipple for engagement with the upper end of said tube, said distributer being provided with corrugations, a cover for said pot engaging said corrugations, and means for lowering the temperature of said cover.

3. In a device of the class described, a boiler formed with an annular shoulder, a coffee pot supported on said shoulder, a communicating passage between the upper portion of the boiler and the upper portion of the pot, a container arranged within the pot, a distributing plate arranged above the container and having a perforated trough at its peripheral edge, a cover for said pot, and means for spacing said distributer from the under face of said cover.

4. In a device of the class described, a boiler, a coffee pot supported by said boiler and having a central tube forming a passage with upwardly converging walls, a container for comminuted coffee supported within the pot, a perforated distributer having a plurality of spaced radial corrugations carried by the upper end of said tube, and a cover for said pot arranged for engagement with said corrugations.

5. In a device of the class described, a boiler, a coffee pot supported by said boiler and formed with an annular shoulder at its upper edge, a tube connecting the interior of the said boiler and pot, a container for comminuted coffee arranged within the coffee pot, a distributer formed of perforated sheet metal and having a raised central portion terminating in a downwardly projecting nipple for engagement with the upper end of said tube, a cover for said pot, and means for spacing said distributer and cover.

6. In a device of the class described, a boiler, a coffee pot supported by said boiler and being formed with an annular shoulder near its upper edge, an inverted cone shaped tube forming an integral part of the pot and effecting communication between the boiler and pot, a perforated container having a removable closure supported on the said shoulder on said pot, a distributer formed of perforated sheet metal and having a raised central portion terminating in a downwardly extending nipple for engagement with the upper end of said tube, a hollow closure for said pot spaced from the said distributer and being provided with a downwardly extending portion centrally located with respect to the said tube opening, and means for permitting the entrance and exit of cooling means to said cover.

In testimony whereof I hereunto affix my signature in the presence of two witnesses.

BENJAMIN S. WILLIAMS.

Witnesses:
R. T. BASSETT,
C. M. HOWELL.